United States Patent
Singh et al.

(10) Patent No.: US 9,187,806 B2
(45) Date of Patent: Nov. 17, 2015

(54) INTERMETALLIC NANOPARTICLES

(71) Applicant: UChicago Argonne, LLC, Chicago, IL (US)

(72) Inventors: Dileep Singh, Naperville, IL (US); Yusuf Yusufoglu, Gebze (TR); Elena Timofeeva, Chicago, IL (US); Jules L. Routbort, Willowbrook, IL (US)

(73) Assignee: UChicago Argonne, LLC, Chicago, IL (US)

( * ) Notice: Subject to any disclaimer, the term of this patent is extended or adjusted under 35 U.S.C. 154(b) by 0 days.

(21) Appl. No.: 14/741,300

(22) Filed: Jun. 16, 2015

(65) Prior Publication Data

US 2015/0280240 A1 Oct. 1, 2015

Related U.S. Application Data

(62) Division of application No. 13/250,442, filed on Sep. 30, 2011, now Pat. No. 9,079,249.

(51) Int. Cl.
*C22C 9/02* (2006.01)
*H01M 4/38* (2006.01)

(52) U.S. Cl.
CPC ... *C22C 9/02* (2013.01); *H01M 4/38* (2013.01)

(58) Field of Classification Search
None
See application file for complete search history.

(56) References Cited

U.S. PATENT DOCUMENTS

| | | |
|---|---|---|
| 2002/0177143 A1 | 11/2002 | Mirkin et al. |
| 2009/0298684 A1 | 12/2009 | Zhou et al. |
| 2010/0173203 A1* | 7/2010 | Zhang et al. ............. 429/231.8 |
| 2010/0261939 A1 | 10/2010 | Armbruester et al. |

OTHER PUBLICATIONS

US Notice of Allowance for U.S. Appl. No. 13/250,442 dated Mar. 10, 2015, 5 pages.
US Office Action for U.S. Appl. No. 13/250,442, dated Sep. 17, 2014, 9 pages.

* cited by examiner

*Primary Examiner* — Patrick Ryan
*Assistant Examiner* — Wyatt McConnell
(74) *Attorney, Agent, or Firm* — Foley & Lardner LLP

(57) ABSTRACT

A process for preparing intermetallic nanoparticles of two or more metals is provided. In particular, the process includes the steps: a) dispersing nanoparticles of a first metal in a solvent to prepare a first metal solution, b) forming a reaction mixture with the first metal solution and a reducing agent, c) heating the reaction mixture to a reaction temperature; and d) adding a second metal solution containing a salt of a second metal to the reaction mixture. During this process, intermetallic nanoparticles, which contain a compound with the first and second metals are formed. The intermetallic nanoparticles with uniform size and a narrow size distribution is also provided. An electrochemical device such as a battery with the intermetallic nanoparticles is also provided.

8 Claims, 11 Drawing Sheets

INTERMETALLIC NANOPARTICLES

CROSS-REFERENCE TO RELATED APPLICATIONS

This application is a Divisional of U.S. application Ser. No. 13/250,442, filed Sep. 30, 2011, incorporated herein by reference in its entirety.

GOVERNMENT INTERESTS

This invention was made with Government support under Contract No. DE-AC02-06CH11357 awarded by the Department of Energy. The Government has certain rights in this invention.

FIELD

The technology generally relates to the field of intermetallic nanoparticles of two or more metals.

BACKGROUND

Intermetallic nanoparticles are desired for various applications because they may exhibit useful properties such as high thermal conductivity, high heat capacity, high electrical conductivity, etc. Typically, intermetallic nanoparticles are prepared by attrition milling of the bulk intermetallic compound or co-precipitation techniques that may require processing at high temperatures. In addition, the nanoparticles that are prepared by milling are not uniform and exhibit a large variation in size.

Since their first commercialization in the 1990s, rechargeable lithium-ion (Li-ion) batteries have served as major power sources for a wide range of electronic products. In recent years, an increase in global energy demand, rising and fluctuating crude oil prices, and environmental concerns have led to an increase in demand for Li-ion batteries. In particular, Li-ion battery technology is being developed for applications in electric vehicles (EVs), hybrid electric vehicles (HEVs), and plug-in hybrid electric vehicles (PHEVs). For such applications, improved Li-ion battery anodes from intermetallic nanomaterials providing high energy density and high power capacity are desired.

SUMMARY

In one aspect, a process is provided including the steps of: dispersing nanoparticles of a first metal in a solvent to prepare a first metal solution; forming a reaction mixture comprising the first metal solution and a reducing agent; heating the reaction mixture to a reaction temperature; and adding a second metal solution comprising a salt of a second metal to the reaction mixture whereby intermetallic nanoparticles are formed, where the intermetallic nanoparticles comprises a compound comprising the first metal and second metal, and the first and second metal are not the same. In some embodiments, the process is conducted under an inert atmosphere. In some embodiments, the first metal is Sn, Pb, In, Ga, Bi, Ge, Zn, Ni. In some embodiments, the second metal is Cu, Ag, Au, Pt, Pd, Ru, Ir, Fe, Co, Ni. In some embodiments, the salt of the second metal may contain sulfates, nitrates, chlorides and acetates such as copper(II) sulfate, copper(II) nitrate, copper (II) chloride, copper(II) acetate, etc. In some embodiments, the reducing agent contains $NaHPO_2$, $NaBH_4$, $LiAlH_4$, citric acid, ascorbic acid, tetrakis (dimethylamine)ethylene.

In some embodiments, the process further includes exposing the intermetallic nanoparticles to a third metal solution comprising a salt of a third metal, whereby the ternary intermetallic nanoparticles are formed comprising a compound comprising the first metal, the second metal and the third metal and where the third metal is not the same as the first metal or the second metal.

In some embodiments, the third metal is Ag, Au, Pt, Pd, Ru, Ir. In some embodiments, the reaction temperature is between about 50° C. to about 200° C. In some embodiments, the reaction temperature is between about 100° C. to about 150° C. In some embodiments, the process further includes cooling the reaction mixture.

In some embodiments, the crystal structure of the intermetallic nanoparticles differs from the crystal structure of the first metal and the second metal. In some embodiments, the intermetallic nanoparticles have an average diameter from about 100 nm to about 400 nm. In some embodiments, the intermetallic nanoparticles have a polydispersity of about 0.2. In some embodiments, the process further includes adding the intermetallic nanoparticles to a heat transfer fluid to form a heat transfer mixture whereby the thermal conductivity of the heat transfer mixture is greater than the thermal conductivity of the heat transfer fluid.

In one aspect, intermetallic nanoparticles are provided having Sn and Cu, where the intermetallic nanoparticles contain a compound comprising Sn and Cu, and the average diameter of the intermetallic nanoparticles is from about 100 nm to about 400 nm. In some embodiments, the intermetallic nanoparticles have a polydispersity less than 0.5. In some embodiments, the intermetallic nanoparticles have a polydispersity of about 0.2.

In some embodiments, an electrode containing the intermetallic nanoparticles is provided. In some embodiments, a battery comprising the electrode is provided. In some embodiments, a heat transfer fluid containing the intermetallic nanoparticles is provided.

In one aspect, an electrochemical device containing an anode, a cathode having intermetallic nanoparticles with Sn and Cu, where the intermetallic nanoparticles is a compound of Sn and Cu, and the average diameter of the intermetallic nanoparticles from about 100 nm to about 400 nm; and an electrolyte. In some embodiments, the electrochemical device is a lithium-ion battery. In some embodiments, the capacity of the battery is greater than 80 mA/g at 0.5 V during the discharge cycle.

Additional features, advantages, and embodiments of the present disclosure may be set forth from consideration of the following detailed description, drawings, and claims. Moreover, it is to be understood that both the foregoing summary of the present disclosure and the following detailed description are exemplary and intended to provide further explanation without further limiting the scope of the present disclosure claimed.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

Figure 1A:
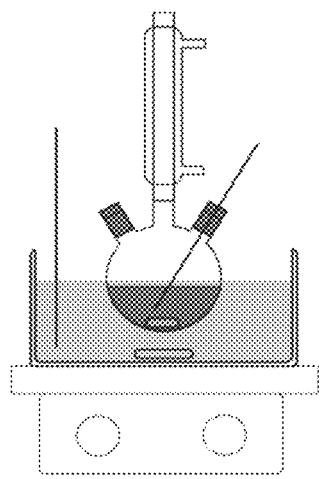
FIGS. 1A and 1B is a schematic of the apparatus used for preparing intermetallic nanoparticles.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

A process is provided for preparing intermetallic nanoparticles using a low-temperature chemical synthesis route. The process includes the steps: a) dispersing nanoparticles of a first metal in a solvent to prepare a first metal suspension, b) forming a reaction mixture with the first metal suspension and a reducing agent, c) heating the reaction mixture to a reaction temperature; and d) adding a second metal suspension containing a salt of a second metal to the reaction mixture. Intermetallic nanoparticles, which contain a compound with the first and second metals are formed by this process.

In some embodiments, the first metal is Sn and the second metal is Cu. In some embodiments, the first metal (M1) is Sn, Pb, Sb, In, Ga, Bi, Ge, Zn, Ni, the second metal (M2) is Cu, Ag, Au, Pt, Pd, Ru, Ir, Fe, Co, Ni and the third metal (M3) is Ag, Ag, Au, Pt, Pd, Ru, Ir. Although not bound by theory, it is understood that the standard electrode potential (SEP) of the second and third metal has to be more positive than SEP of the first metal for spontaneous redox exchange reaction. In some embodiments, the intermetallic nanoparticles may contain $Cu_3Sn$, $Cu_6Sn_5$ or M1, M2, M3 wherein x & y is an integer between 1 to 8 and z is an integer from 0 to 8. One copper atom can be substituted with Ni, Zn, Fe, etc., to form intermetallic nanoparticles such as $NiCu_5Sn_5$, or $FeCu_5Sn_5$. These intermetallic nanoparticles have volumetric capacity (mAh/cc) of almost 3 times that of graphite.

It is understood that the steps of the inventive process may be conducted in different orders. In some embodiments, the reaction mixture may be heated before the addition of the reducing agent. In some embodiments, the reducing agent may be added after the addition of the second metal solution. In some embodiments, aliquots of the reducing agent and/or the second metal solution may be added. It is also understood that two or more steps of the process may be combined into one step.

The term "intermetallic" refers to a compound with one solid phase containing two or more metallic elements—a first metal (M1), a second metal (M2), a third metal (M3), so on, wherein the crystal structure of the intermetallic compound differs from the crystal structures of the constituents. The term "metal" refers to any element that is a good conductor of electricity and heat and forms cations. In some embodiments, the first metal is Sn, and the second metal is Cu.

As used herein, the term "nanoparticles" refers to particles that have a single crystallite grain between 10 nm to 500 nm. Individual grains can agglomerate into clusters/agglomerates up to 10 μm in diameter. In some embodiments, the nanoparticles have a diameter between 150 nm to 750 nm. In some embodiments, the nanoparticles have a diameter between 200 nm to 500 nm. In some embodiments, the nanoparticles have a diameter between about 100 nm to about 400 nm. The particle sizes of the intermetallic nanoparticles can be controlled by controlling the process conditions, such as size of precursor M1 particles, concentration of M2 and M3 salts and reducing agent, temperature, pH, and addition of capping agents.

Figure 1B:
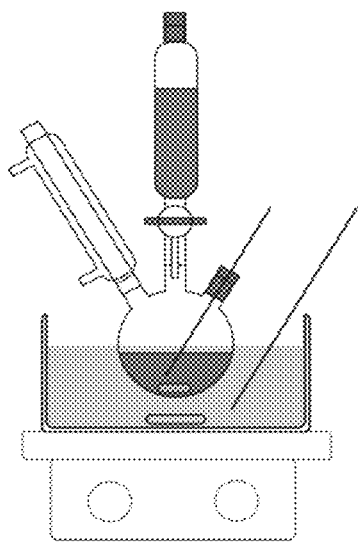
Figure 2A:
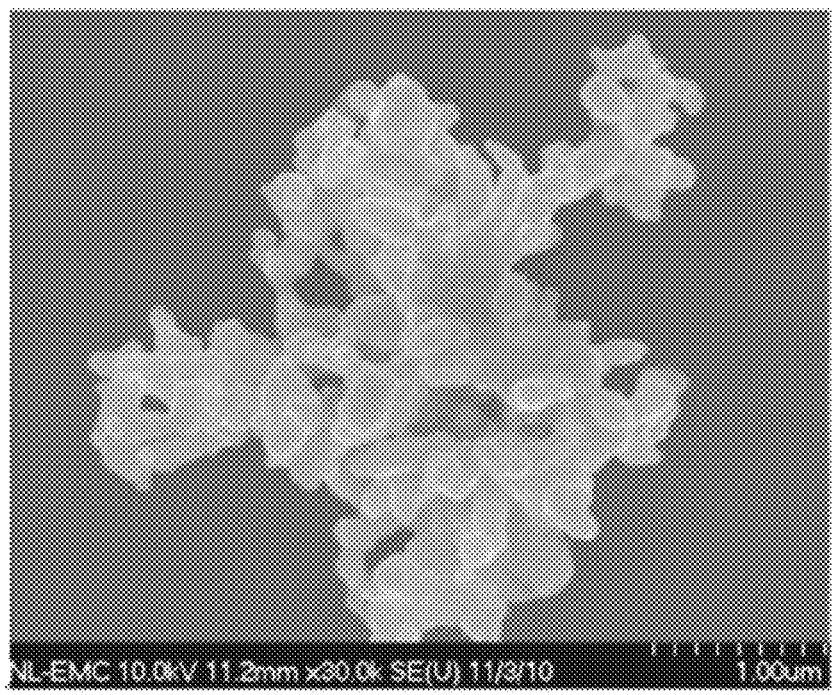
FIG. 2A is a scanning electron microscope (SEM) image of $Cu_6Sn_5$ product of Example 2.
Figure 2B:
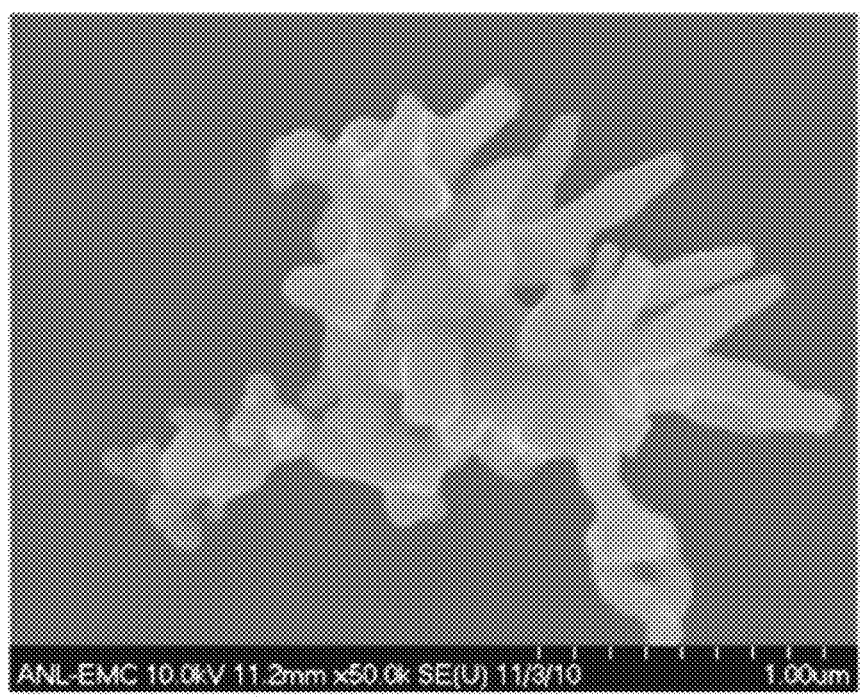
FIG. 2B is a SEM image of $Cu_6Sn_5$ product of Example 2.
Figure 2C:
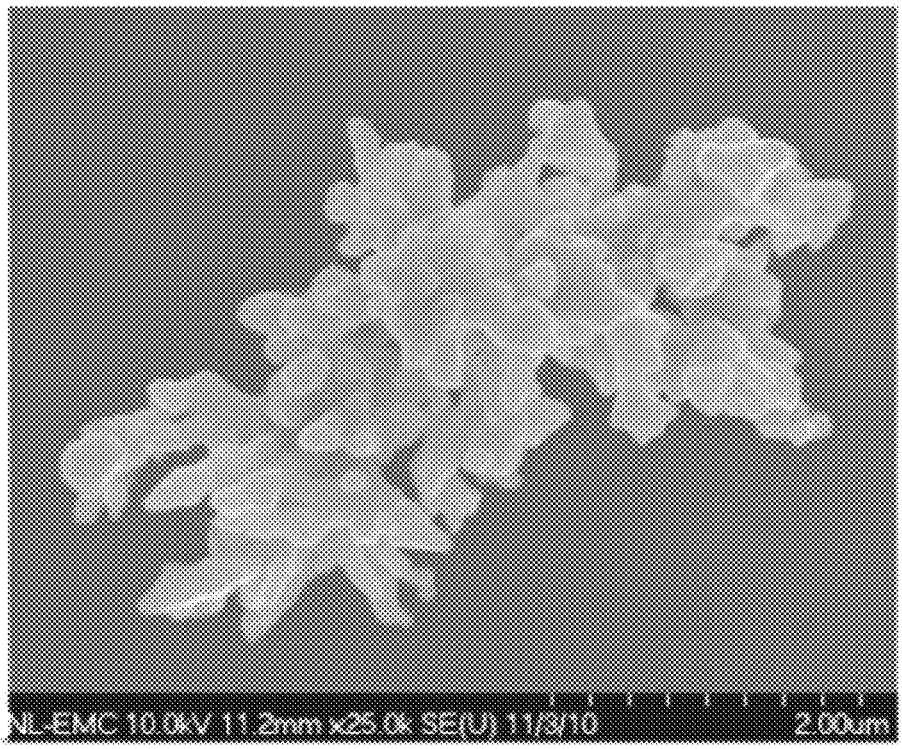
FIG. 2C is a SEM image of $Cu_6Sn_5$ product of Example 2.
Figure 2D:
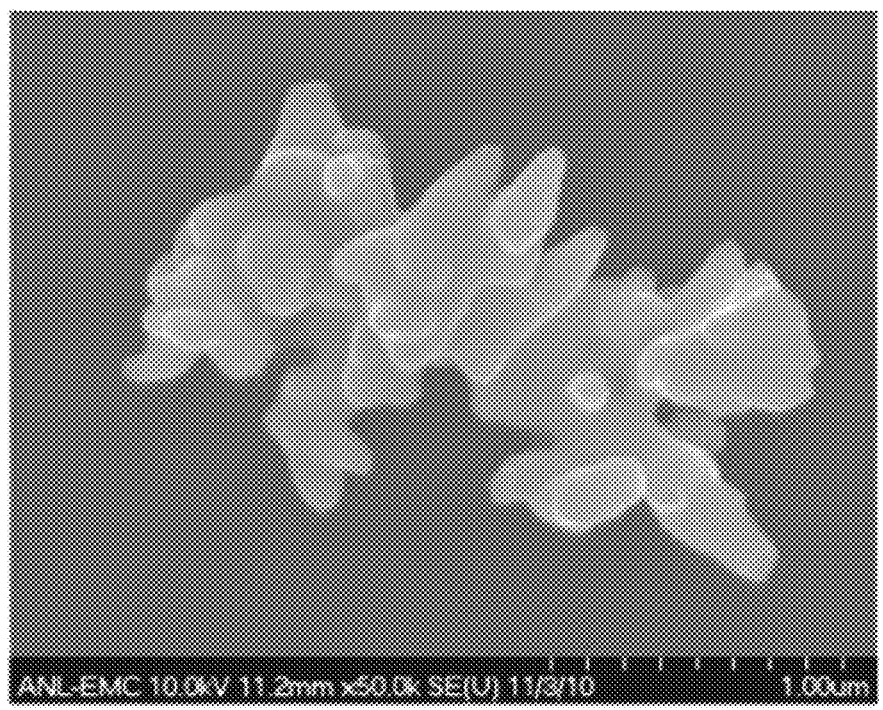
FIG. 2D is a SEM image of $Cu_6Sn_5$ product of Example 2.
Figure 2E:
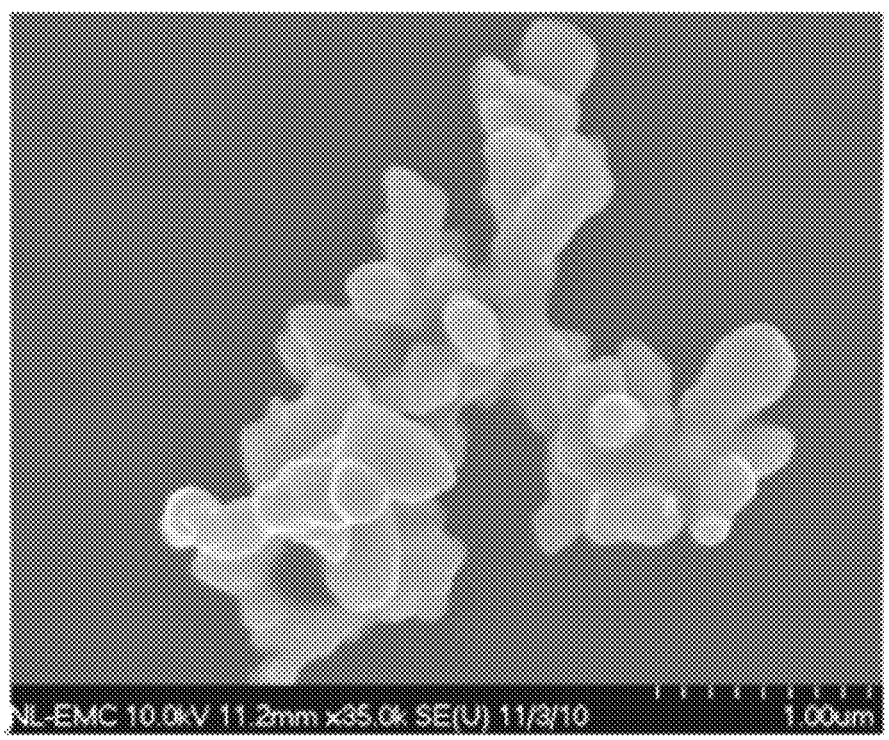
FIG. 2E is a SEM image of $Cu_6Sn_5$ product of Example 2.

In one embodiment, intermetallic nanoparticles with Sn and Cu are formed. The Sn nanoparticles are dispersed in a solvent to form a reaction mixture. In some embodiments, sonication, stirring or mechanical agitation may be used to disperse the Sn nanoparticles. In some embodiments, a dispersing agent may be used. Although not bound by theory, the addition of reducing agent prior to addition of the second metal solution helps to reduce any existing oxide on the surface of the first metal particles. In some embodiments, the reaction mixture may be formed under an inert atmosphere as shown in FIG. 1A. A reducing agent is added to the reaction mixture. The reaction mixture is heated to a reaction temperature of 110° C. A solution of copper sulfate was slowly added to the reaction mixture and the intermetallic nanoparticles were formed. In some embodiments, the copper sulfate solution is added dropwise under an inert atmosphere as shown in FIG. 1B.

In some embodiments, the solvent is an organic solvent or an aqueous solution. In some embodiments, the solvent may be an organic solvent such as ethylene glycol, diethylene glycol, tetraethyleneglycol, glycerin, therminols, or an aqueous solution like deionized water, ethanol.

The reducing agent is a chemical that donates electrons in a redox reaction. In some embodiments, the reducing agent may be phosphinates such as $NaH_2PO_2$, or hydrides such as $LiAlH_4$, sodium borohydride, citric acid, ascorbic acid, tetrakis (dimethylamine)ethylene.

It is understood that the intermetallic nanoparticles may be further processed to form ternary intermetallic nanoparticles containing a third metal in a single or multiple steps. A ternary intermetallic nanoparticles is a compound which contains three different metals. In some embodiments, the mixture of the M2 and M3 metal salts can be added to the suspension of M1 nanoparticles. In some embodiments, the intermetallic nanoparticles with the first and second metals may be exposed to a third metal solution containing the salt of a third metal. In some embodiments, exposure to the third metal solution may be done by adding it in the reaction mixture after the intermetallic nanoparticles are formed.

One of the advantages of the present process is that the intermetallic nanoparticles can be formed at a relatively low temperatures ranging from about 50° C. to about 200° C. In some embodiment, the reaction temperature may be between about 100° C. to about 150° C. In some embodiments, the reaction temperature may vary during the formation of the intermetallic nanoparticles. In some embodiments, the reaction temperature is held constant at 110° C. or 140° C.

Although not bound by theory, it is understood that the reaction temperature plays a role in the formation of the intermetallic nanoparticles. In some embodiments, the reaction temperature was chosen based on factors such as the melting point of the first and second metals, type of the solvent fluid, concentration of metal salt and reducing agent, type of reducing agent, and the difference in standard potential of M2 and M1. Each of these parameters controls the overall rate of reaction.

Although not bound by theory, it is understood that two chemical reactions are taking place during intermetallic nanoparticle synthesis: (1) reduction of copper by reducing agent (represented by Equation 1); and (2) displacement of metallic Sn by Cu (represented by Equation 2):

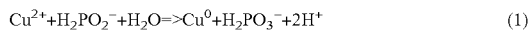

$$Cu^{2+} + H_2PO_2^- + H_2O \Rightarrow Cu^0 + H_2PO_3^- + 2H^+ \quad (1)$$

$$Sn^0 + Cu^{2+} \Rightarrow Sn^{2+} + Cu^0 \quad (2)$$

In some embodiments, excess reducing agent may be added to the reaction mixture. Although not bound by theory, it is understood that excess reducing agent removed any surface oxides from Sn nanoparticles and ensured the completeness of $Cu^{2+}$ reduction.

After formation, the intermetallic nanoparticles may be separated from the reaction mixture by any known method of separation including centrifugation or filtration. In some embodiments, the intermetallic nanoparticles may be washed and dried. In some embodiments, the process of separation and/or drying leads to the agglomeration of the intermetallic nanoparticles into larger aggregates. For example, such aggregates may form during drying before SEM imaging (as shown in FIGS. 2A to 2E).

Figure 3B:
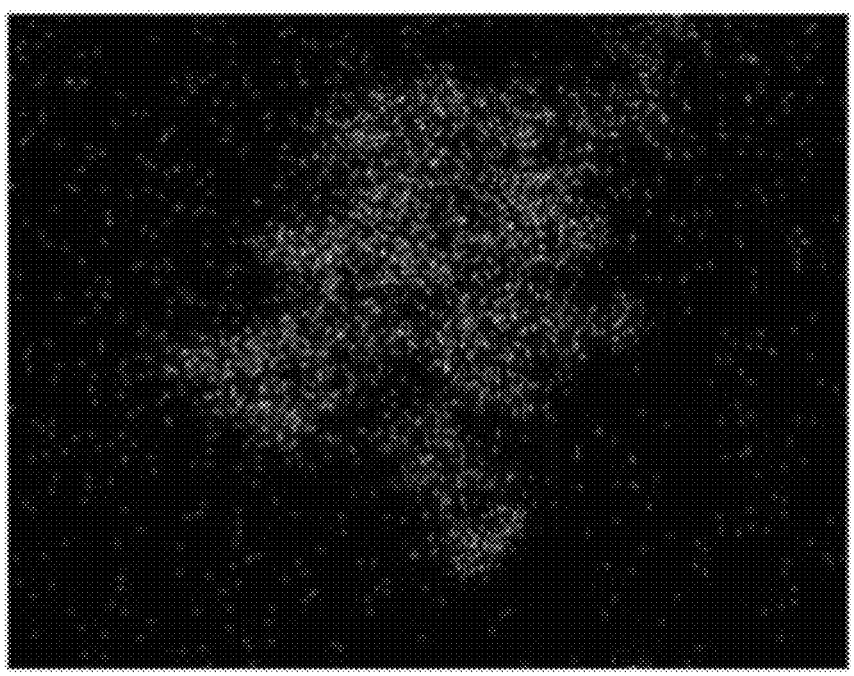
FIG. 3B is an elemental distribution map of Cu using Energy Dispersive X-ray (EDAX) spectroscopy.
Figure 4A:
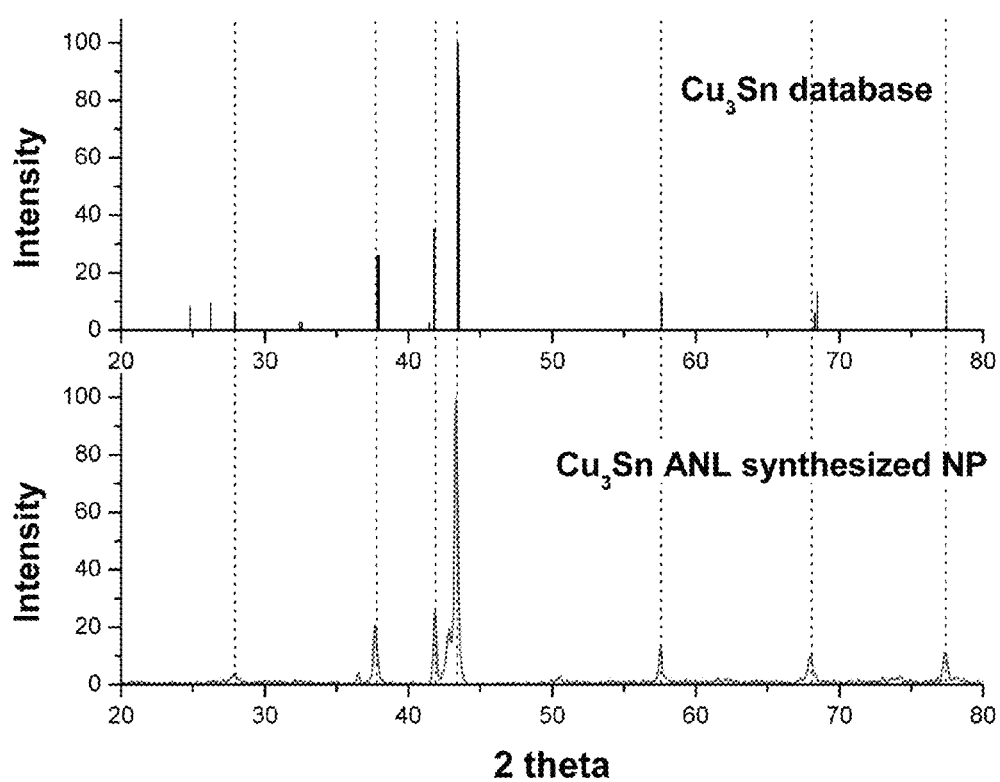
FIG. 4A is an X-ray diffraction (XRD) pattern of $Cu_3Sn$ intermetallic nanoparticles.
Figure 4B:
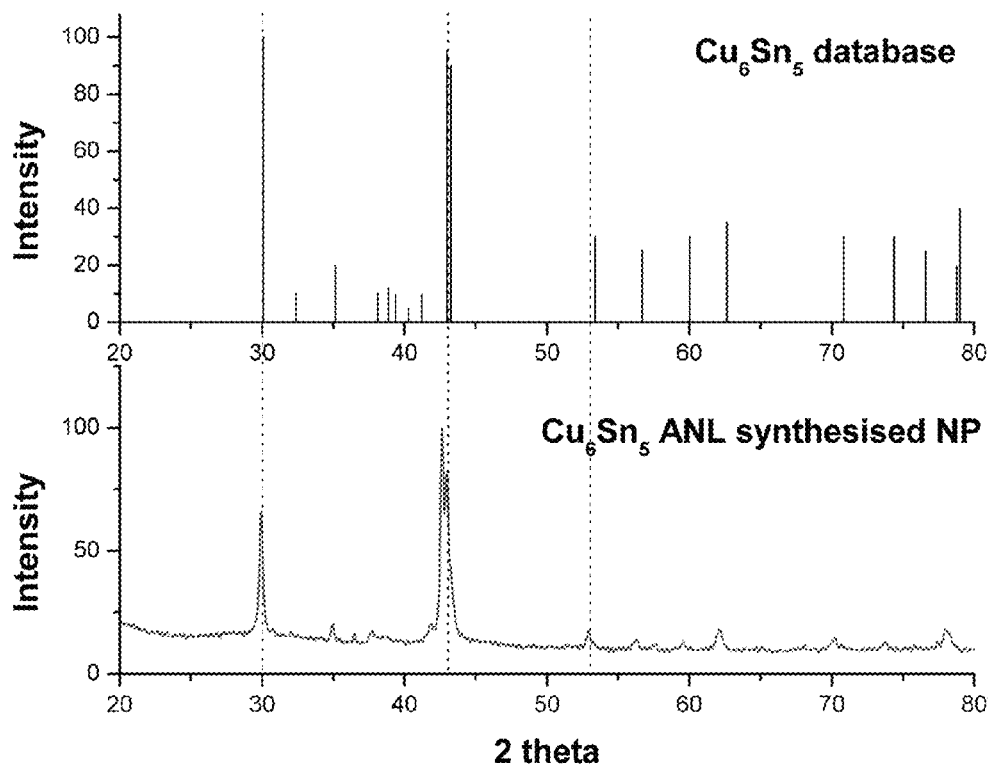
FIG. 4B is an XRD pattern of $Cu_6Sn_5$ intermetallic nanoparticles.
Figure 5A:
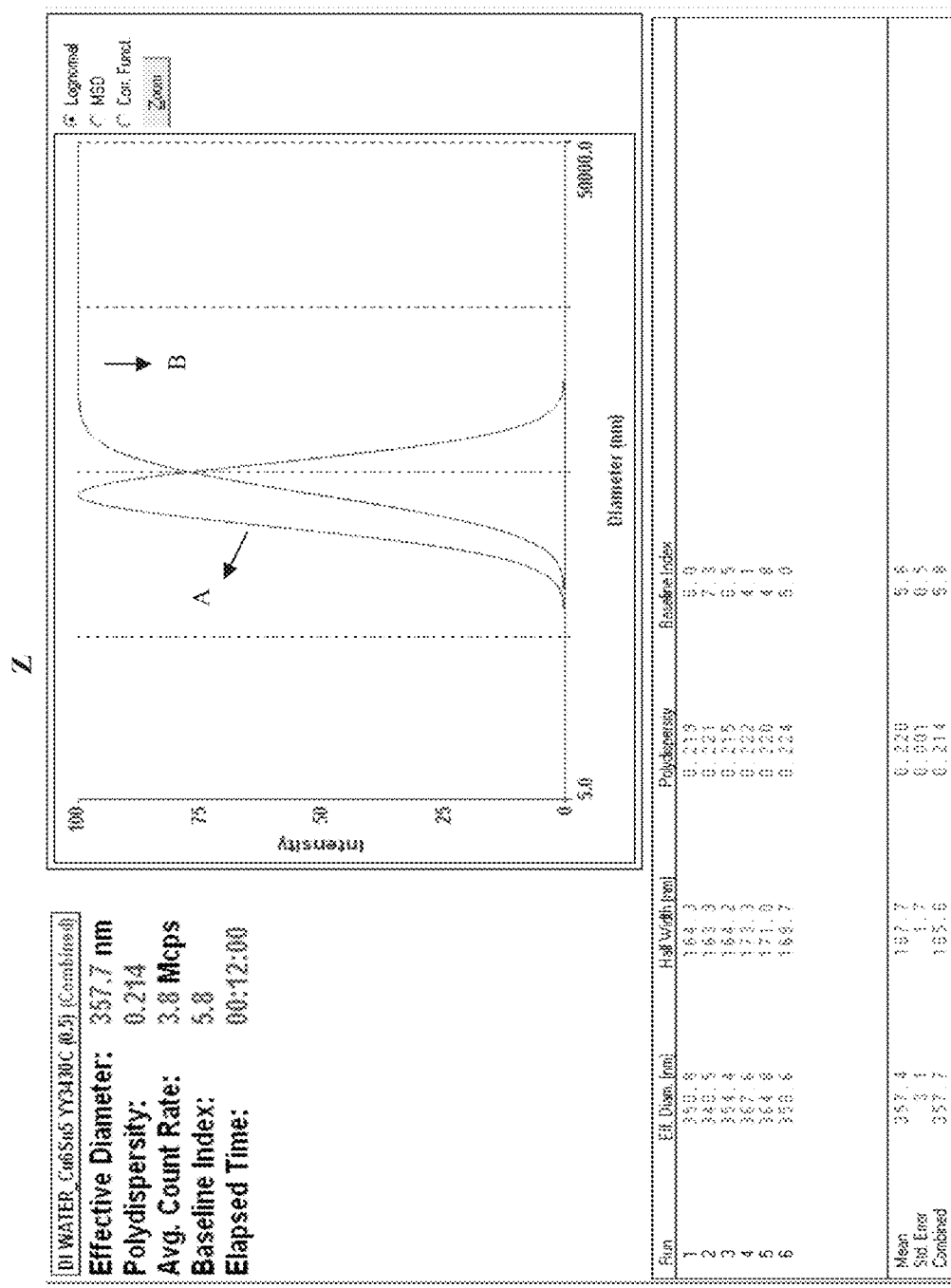
FIG. 5A depicts the particle size distribution (curve A) of $Cu_6Sn_5$ intermetallic nanoparticles using Dynamic Laser Scattering data. The second curve (B) shows volumetric percentage of the particles of a given size, i.e. indicates that most particles are of the average size.

The intermetallic nanoparticles formed have consistent shapes and exhibit a narrow range of sizes. As shown in FIGS. 4A and 4B the XRD pattern showed no major peaks beside the intermetallic phase, which is indicative of homogenous distribution of Sn and Cu atoms within the nanoparticles. In addition, *EDAX* mapping of $Cu_3Sn$ cluster (in FIGS. 3B and C) also confirmed the homogenous distribution of Sn and Cu. The particle size distribution may be measured using Dynamic Light Scattering (DLS) technique. DLS can indirectly measure the particle size distribution of small particles in a suspension. When light hits small particles the light scatters in all directions and the light scattering also varies with time due to Brownian motion of the particles. Two important measures of DLS is the average diameter and polydispersity. The value of the average diameter may be obtained from correlation function by appropriate mathematical model of particles moving in brownian motion (as shown in FIG. 5A). The polydispersity value reflects the fraction of particles that deviate from average size. As the polydispersity value reaches zero, the variation in the average diameter size shrinks. In contrast a the polydispersity value approaches 0.5, nanoparticles have a large variation in sizes. Although not bound by theory, the present process obtains nanoparticles with limited variation in sizes by dispersing the nanoparticles of the first metal and closely controlling the addition of the second metal solution concentration of the second metal, the concentration of the reducing agent, and the reaction temperature.

The intermetallic nanoparticles of the present invention may be used in a variety of applications including as catalysts (with or without support), electrode materials for electrochemical devices, as additives to heat transfer fluids, electrical interconnect material, etc. In some embodiments, the intermetallic nanoparticles may be used in the preparation of electrodes for use in a wide variety of applications including, but not limited to, electrochemical cells, batteries, and supercapacitors. In some embodiments, the intermetallic nanoparticles may be added to a heat transfer fluid to form a heat transfer mixture to enhance heat transfer for use in a variety of applications such as in power plants, concentrated solar power facilities, etc. The addition of the intermetallic nanoparticles in a heat transfer fluid may enhance the heat transfer properties of the mixture by increasing heat capacity and heat conductivity. In some embodiments, the intermetallic nanoparticles may be used as electrically conductive materials for interconnects in electrical wiring.

Some embodiments provide an electrochemical device comprising: a cathode; an anode; and a non-aqueous electrolyte. In some embodiments, the electrochemical device may be a battery, a fuel cell, a capacitor, etc. In some embodiments, the electrochemical device is a lithium secondary battery (the Li-ion battery). In the Li-ion battery, the cathode may be lithium-based; the anode is a carbon containing the intermetallic nanoparticles; and the anode and cathode are separated from each other by a porous separator. It is understood that the present intermetallic nanoparticles may be used with various types of support material such as carbon to form supported catalysts.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present technology, thus generally described, will be understood more readily by reference to the following examples, which are provided by way of illustration and are not intended to be limiting.

EXAMPLES

Example 1

Preparation of $Cu_3Sn$. Metallic tin (Sn) nanoparticles (<100 nm) manufactured by American Elements were suspended in ethylene glycol (EG) and sonicated for at least 10 minutes with Branson 450 Sonifier at 40% load and 50% duty cycle. The Sn nanoparticles were placed in a three-neck round bottom flask (500 ml) as shown in FIG. 1A with continuous mixing by a magnetic stirrer under nitrogen gas purge to provide an inert atmosphere and additional mixing. A 0.075M solution of $NaH_2PO_2 \cdot H_2O$ (7.9 g in 150 mL) was added to the flask at the average rate of ~2 ml/min. The mixture was heated to the reaction temperature of 140° C. A solution of 0.014M $CuSO_4 \cdot 5H_2O$ (3.52 g in 50 mL) was slowly added to the reaction mixture at an average rate of ~1 ml/min under nitrogen gas purge as shown in FIG. 1B. The reaction was continued for 30 minutes past the addition of copper salt solution. Then the heating was terminated, and mixture was cooled to the room temperature with continued stirring and $N_2$ purge.

The resulting solid product was separated from the reaction mixture by centrifuging, followed by decanting and washed once with pure EG, and 3 times with ethanol and once with acetone. XRD of the product showed that it was $Cu_3Sn$ in one solid phase with minor impurities.

Figure 3A:
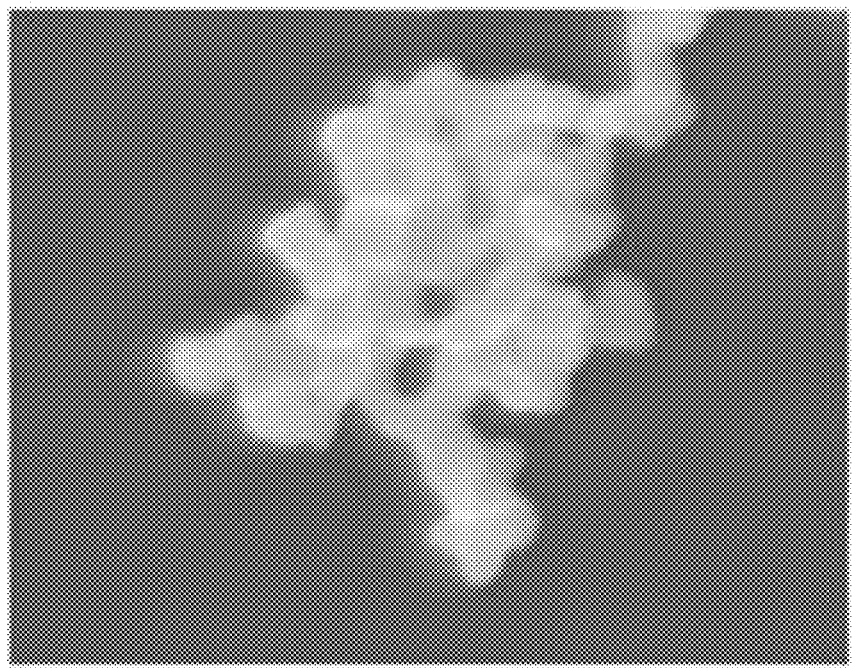
FIG. 3A is a SEM image of $Cu_3Sn$, product of Example 2.

SEM images of the product from Example 1 is shown in FIG. 3A. These images show the intermetallic nanoparticles after they have aggregated during the drying process.

Figure 3C:
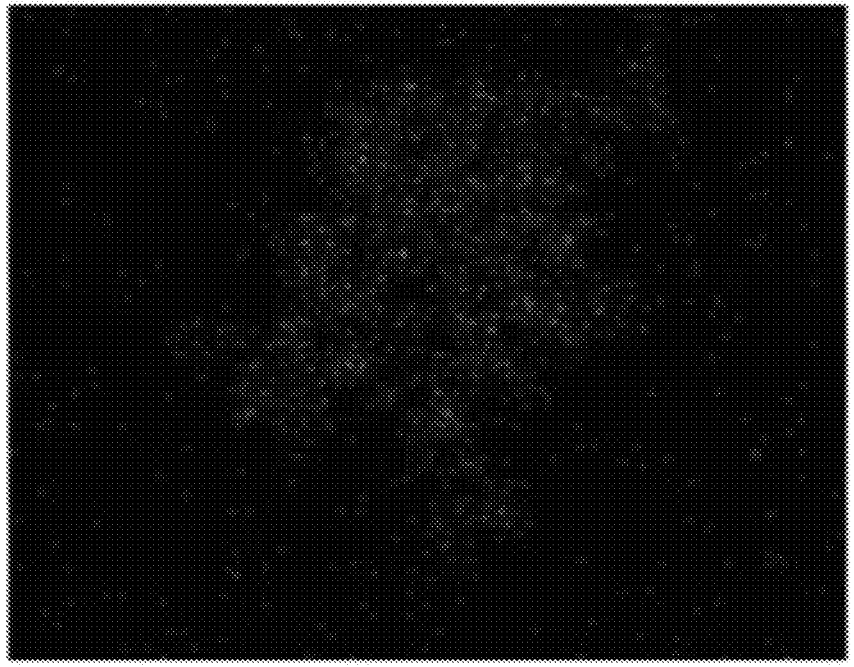
FIG. 3C is an elemental distribution map of Sn using EDAX spectroscopy.

The product from Example 1 was placed on a Si substrate and an elemental analysis was done using Energy Dispersive X-ray (EDAX) spectroscopy. FIGS. 3B and 3C show the elemental mapping of Cu and Sn, respectively. FIG. 3A is the SEM image of the same intermetallic nanoparticle aggregate. Cu and Sn are distributed fairly evenly within the intermetallic nanoparticles as shown in FIGS. 3B and 3C.

The product from Example 1 was characterized with X-ray diffraction (XRD). The XRD pattern shown in FIG. 4A confirm that the product from Example 1 is $Cu_3Sn$ because the experimental peaks matches up (bottom graph) with the peaks reported in the Power Diffraction (ICDD) database (03-065-4653).

Example 2

Preparation of $Cu_6Sn_5$. The same procedure was followed as in Example with modifications listed in Table 1.

TABLE 1

Example 1 and 2

| Example | Product | Sn nanoparticles in 100 ml of EG | $NaH_2PO_2*H_2O$ in 150 ml of EG | $CuSO_4*5H_2O$ in 50 ml of EG | Reaction temperature | Product weight |
|---|---|---|---|---|---|---|
| 1 | $Cu_3Sn$ | 1.18 g (0.01M) | 7.9 g (0.075M) | 3.52 g (0.014M) | 140° C. | 2.5 g |
| 2 | $Cu_6Sn_5$ | 2.9 g (0.024M) | 7.9 g (0.075M) | 3.99 g (0.016M) | 110° C. | 2.9 g |

The product from Example 2 was characterized using X-ray diffraction (XRD). The XRD pattern shown in FIG. 4B confirms that the product from Example 1 is $Cu_6Sn_5$ because the experimental peaks match up with the peaks reported in the ICDD (00-045-1488) database (top base).

Figure 5B:
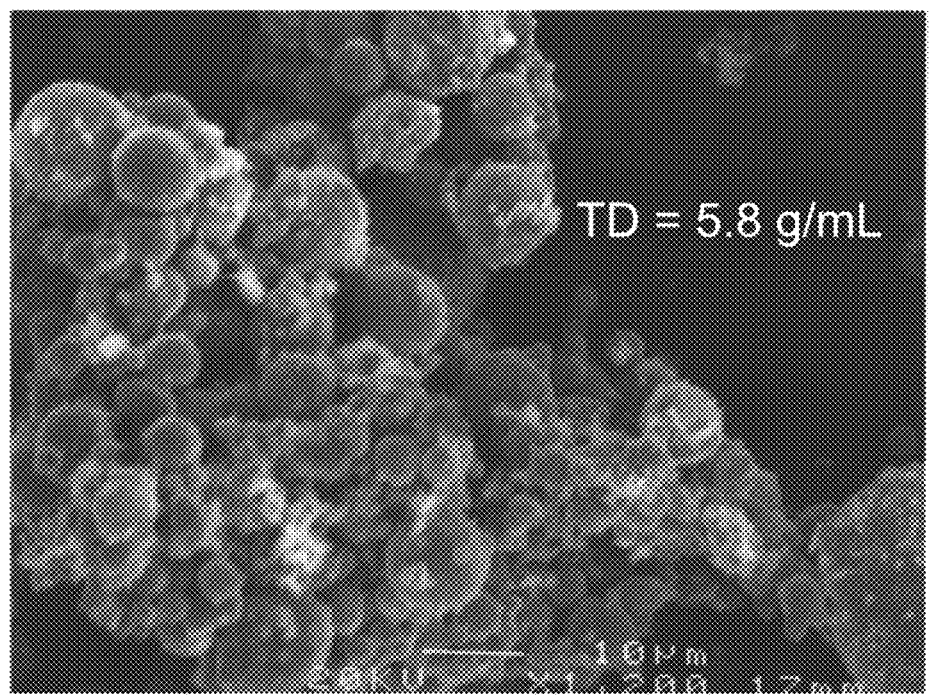
FIG. 5B is an SEM image of $Cu_6Sn_5$ particles from a commercial source.

The product from Example 2 was dispersed in deionized water and Dynamic Laser Scattering (DLS) technique was used to determine the particle size distribution. The results of DLS shown in FIG. 5A indicates that the average diameter for the $Cu_6Sn_5$ nanoparticles was ~360 nm. In addition, the $Cu_6Sn_5$ nanoparticles have a relatively narrow range of distribution as evidenced by a polydispersity value of 0.21. This indicates that the intermetallic nanoparticles prepared by this method had a uniform size. In comparison, commercially available $Cu_6Sn_5$ nanoparticles are larger (several microns) and have a large distribution of sizes as shown in FIG. 5B (SEM image of $Cu_6Sn_5$ nanoparticles produced by Wildcat Technologies).

Example 3

Preparation and Testing of electrodes with $Cu_6Sn_5$. Electrodes were prepared with 80 wt. % of the product from Example 2, 10 wt. % acetylene black as the conductive agent, and 10 wt. % polyvinylidene difluoride binder. The loading density of the active material was around 4.8 mg/cm². The electrolyte was 1.2M $LiPF_6$ dissolved in a mixture of ethylene carbonate (EC) and ethyl methyl carbonate (EMC) in a 3:7 volume ratio.

Figure 6:
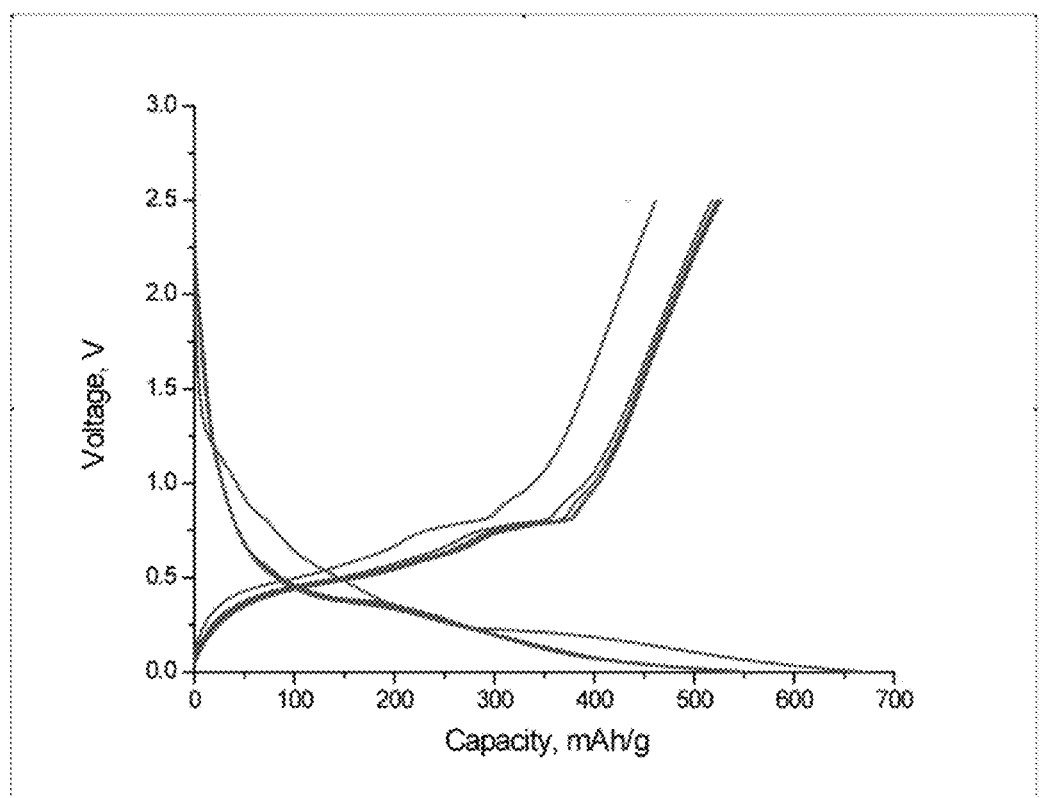
FIG. 6 is a graph showing capacity versus voltage of a Li-ion coin cell with $Cu_6Sn_5$ intermetallic nanoparticles as the positive electrode during several charge/discharge cycles.

CR2032-type coin cells (1.6 cm²) were assembled with lithium metal as the negative and the electrode above as the positive electrode. The cells were discharged first to 0V and then charged to 2.5 V. Thereafter the cells were discharged and charged between 0 and 2.5 V for several cycles under the current density of 20 mA/g. The capacity in MAh/g was measured at different voltages during several charge/discharge cycles is shown in FIG. 6. The Li-ion battery tested with the $Cu_6Sn_5$ nanoparticles showed superior performance as compared to values in the literature. During the discharges (decreasing voltage), the capacity at 0.5V was between 100 to 150 mAh/g. It is understood that the smaller and nearly uniform sizes of the intermetallic nanoparticles and the narrow size distribution leads to superior performance.

The use of the terms "a" and "an" and "the" and similar referents in the context of describing the elements (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Additionally the phrase "consisting essentially of" will be understood to include those elements specifically recited and those additional elements that do not materially affect the basic and novel characteristics of the claimed invention. The phrase "consisting of" excludes any element not specifically specified.

The present disclosure is not to be limited in terms of the particular embodiments described in this application. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. Intermetallic nanoparticles comprising:
   a compound comprising Sn and Cu, and the average diameter of the intermetallic nanoparticles is from about 100 nm to about 400 nm.

2. The intermetallic nanoparticles of claim 1, wherein the intermetallic particles have a polydispersity less than 0.5.

3. The intermetallic nanoparticles of claim 2, wherein the intermetallic nanoparticles have a polydispersity of about 0.2.

4. The intermetallic nanoparticles of claim 2, wherein the compound is selected from the group consisting of $Cu_6Sn_5$ and $Cu_3Sn$.

5. The intermetallic nanoparticles of claim 4, wherein the nanoparticles have Cu and Sn in a single phase.

6. An electrochemical device comprising:
   an anode;
   a cathode comprising intermetallic nanoparticles comprising Sn and Cu, wherein the intermetallic nanoparticles a compound comprising Sn and Cu, and the average diameter of the intermetallic nanoparticles from about 300 nm to about 400 nm; and
   an electrolyte.

7. The electrochemical device of claim 6, wherein the electrochemical device is a lithium-ion battery.

8. The electrochemical device of claim 7 wherein the capacity is greater than 80 mA/g at 0.5 V during the discharge cycle.

\* \* \* \* \*